United States Patent [19]

Hefling

[11] 4,436,081

[45] Mar. 13, 1984

[54] DAMPER ASSEMBLY FOR BARBECUE GRILL

[75] Inventor: Dennis V. Hefling, Wichita, Kans.

[73] Assignee: The Coleman Company, Inc., Wichita, Kans.

[21] Appl. No.: 343,321

[22] Filed: Jan. 27, 1982

[51] Int. Cl.³ .............................................. F23L 3/00
[52] U.S. Cl. ............................ 126/285 A; 126/25 A; 126/146; 126/245
[58] Field of Search ............... 126/285 A, 285 R, 289, 126/290, 25 R, 25 A, 25 AA, 25 C, 26, 77, 146, 60, 66, 245, 242

[56] References Cited

U.S. PATENT DOCUMENTS

| 121,667 | 12/1871 | Schuyler | 126/242 |
| 290,316 | 12/1883 | Burns | 126/289 |
| 497,840 | 5/1893 | Thompson | 126/285 A |
| 532,855 | 1/1895 | Wilson | 126/60 |
| 661,707 | 11/1900 | Sanford | 126/146 |
| 3,126,881 | 3/1964 | Blotsky, Jr. | 126/245 |

FOREIGN PATENT DOCUMENTS 25793  4/1915  Norway ............... 126/242

Primary Examiner—James C. Yeung

[57] ABSTRACT

A barbecue grill is provided with a sliding damper for controlling the flow of combustion air into the grill. The damper is slidably mounted on the upper surface of a plate having an opening, and the damper is movable by a control rod which is secured to the damper and which extends to the outside of the grill.

9 Claims, 8 Drawing Figures

U.S. Patent   Mar. 13, 1984   Sheet 1 of 2   4,436,081
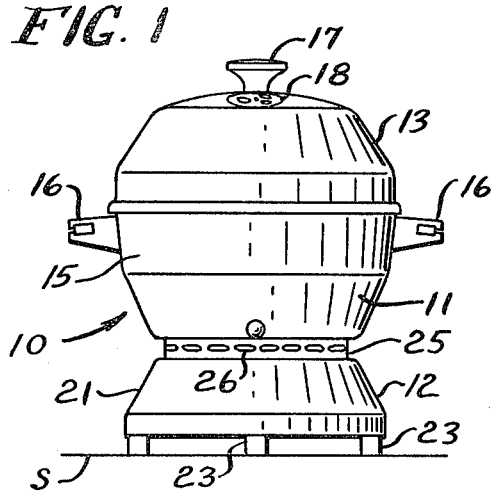
FIG. 1
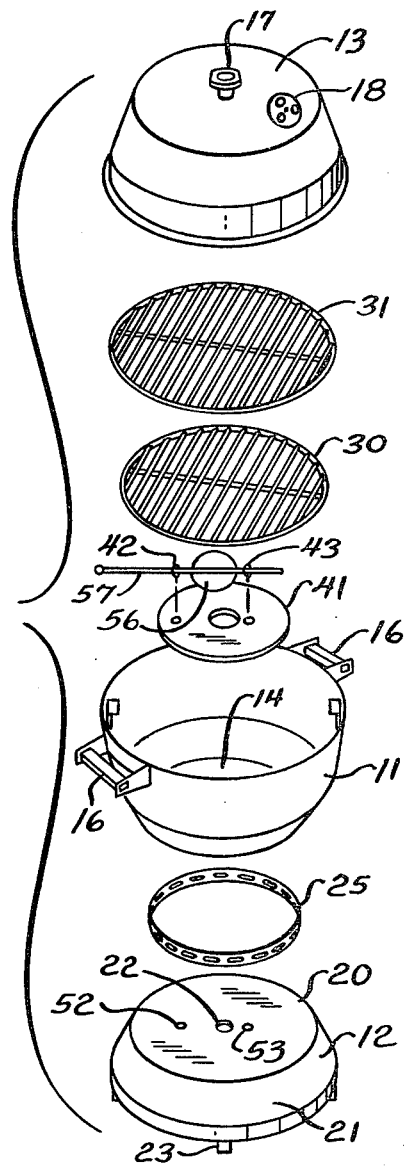
FIG. 2
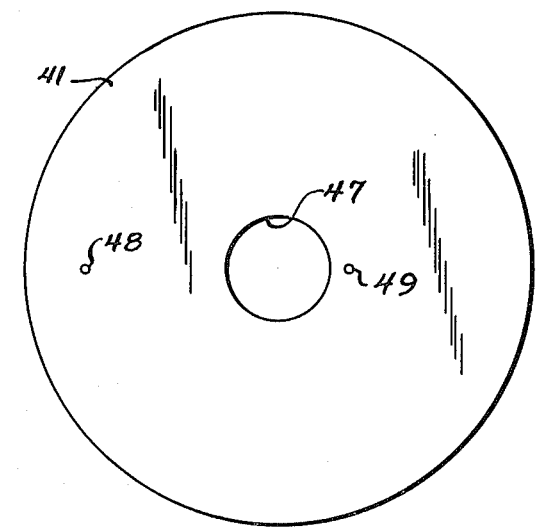
FIG. 5
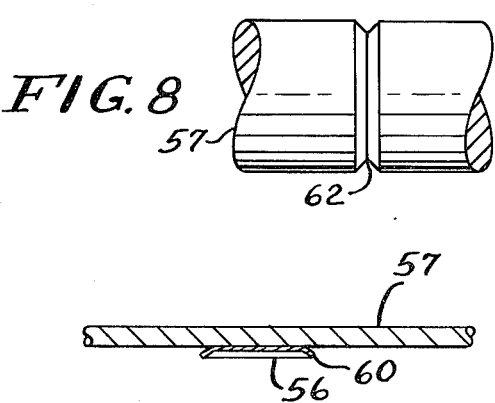
FIG. 8
FIG. 7
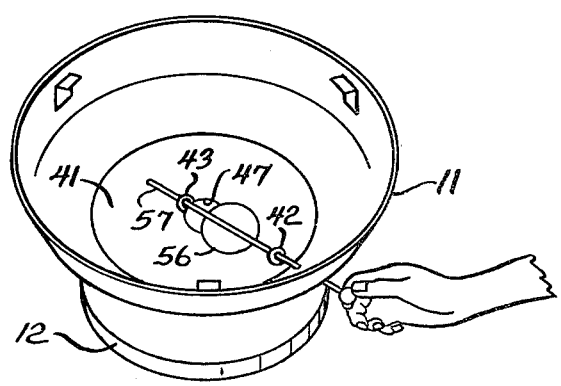
FIG. 6

DAMPER ASSEMBLY FOR BARBECUE GRILL

BACKGROUND AND SUMMARY

This invention relates to barbecue grills or smokers, and, more particularly, to a sliding damper for a barbecue grill or smoker.

Barbecue grills or smokers for barbecuing or smoking meat are well known. Such grills or smokers conventionally include an outer casing, a grate within the outer casing for supporting the meat, and some means for heating the meat, e.g., charcoal or gas. The outer casing is usually provided with one or more openings for supplying combustion air to the heating source, and these combustion air openings may be provided with dampers for adjusting the amount of air which can flow through the openings. Conventional dampers include discs which are rotatably mounted on the outside of the casing or plates which are slidably mounted on the outside of the casing. Since these dampers are mounted on the outside of the casing, they can be easily manipulated to vary the effective size of the combustion air openings. However, the external mounting of dampers causes certain problems. For example, the combustion air opening is usually located below the heating source in the bottom of the outer casing of the grill. As a result, ashes and other combustion products can accumulate above the opening and prevent or retard air flow even when the damper is fully open.

The invention provides a sliding or guillotine type internal damper which is self-cleaning and which can be conveniently operated from outside of the grill to provide excellent temperature control. A damper disc is slidably mounted on the upper surface of a slide plate mounted on the inside of the grill below the heating source. The slide plate is provided with a large opening, and the damper disc is sized to cover the opening. A rod attached to the damper disc extends to the outside of the casing so that the damper can be controlled externally.

The damper is slidable between a fully closed position in which it completely covers the opening in the plate to a fully open position in which it completely uncovers the opening. The opening in the plate has a relatively large diameter, and when the damper is fully open, ashes and other debris above the opening will be unsupported and will fall through the opening. The damper is in sliding contact with the upper surface of the plate, and the sliding or guillotine action serves to break up ashes which accumulate on the plate around the air opening. The damper thereby provides a self-cleaning action for the air opening each time the damper is opened and closed and preserves the full size of the air opening. The damper assembly is simple in structure and operation and cooperates with the grill casing in a unique way to maintain the structural integrity of the damper assembly.

DESCRIPTION OF THE DRAWING

The invention will be explained in conjunction with an illustrative embodiment shown in the accompanying drawing, in which:

FIG. 1 is an elevational view of a barbecue grill which includes a damper assembly in accordance with the invention;

FIG. 2 is an exploded perspective view of the barbecue grill of FIG. 1;

FIG. 5 is a top plan view of the slide plate of the damper assembly;

FIG. 6 is a perspective view showing the operation of the damper assembly;

FIG. 7 is an enlarged fragmentary sectional view of the damper disc and the control rod; and FIG. 8 is an enlarged fragmentary view of one of the position-indicating grooves in the control rod.

DESCRIPTION OF SPECIFIC EMBODIMENT

Figure 3:
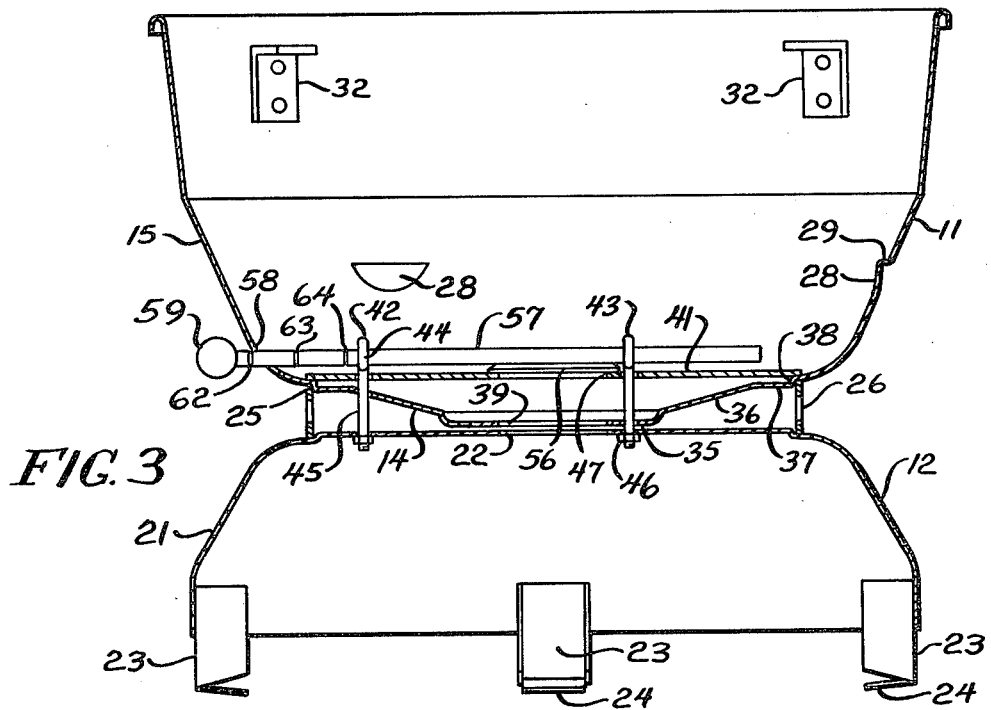
FIG. 3 is an enlarged sectional view of the grill without the cover and the grates.

Referring first to FIGS. 1 and 2, the numeral 10 designates generally a portable barbecue cooker or grill. The grill includes an outer casing 11, a base 12, and a cover 13. The casing is generally bowl-shaped and includes a bottom wall 14 (see also FIGS. 3 and 4) and a generally frusto-conical sidewall 15. A pair of handles 16 are secured to the sidewall.

The cover has a shape similar to that of the casing. A knob 17 is secured to the top of the cover for lifting the cover. The cover is provided with three air vents or openings, and a vent cover 18 is rotatably secured to the cover. The vent cover is also provided with three openings, and the vent cover is rotatable between a closed position and an open position in which the vent openings are closed and open, respectively.

The base 12 is also bowl-shaped and includes a flat top wall 20 and a frusto-conical sidewall 21. A center opening 22 is provided in the top wall. Four supporting feet 23 are secured to the sidewall and position the base above the supporting surface S. Each foot is generally channel-shaped (see FIG. 3) and includes a bottom tab 24 which contacts the supporting surface.

A circular collar 25 between the base 12 and the casing 11 supports the casing above the base. The collar is provided with air openings 26 which permit air to circulate in the space between the bottom wall of the casing and the top wall of the base.

Figure 4:
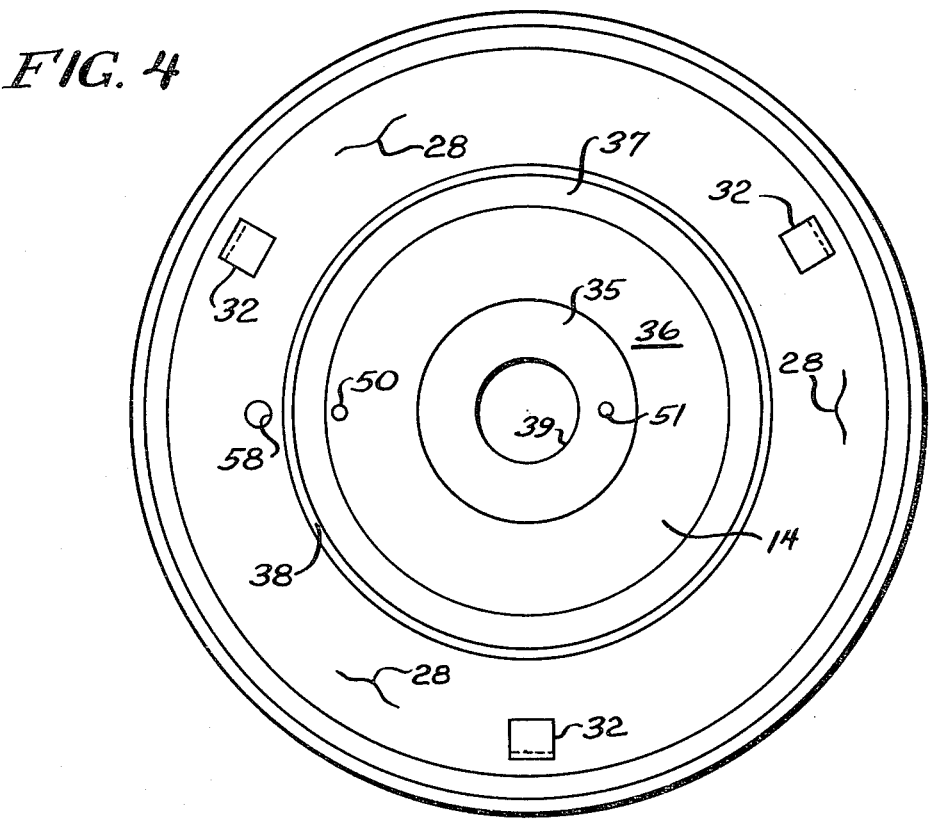
FIG. 4 is a top plan view of the casing of the grill without the damper assembly.

Referring now to FIGS. 3 and 4, the sidewall 15 of the casing is provided with three inwardly extending embossments 28 each of which includes a flat top supporting surface 29. The flat surfaces of the embossments support a rock grate 30 (FIG. 2). The rock grate can support charcoal briquettes if the barbecue grill uses charcoal as a heat source or conventional rock briquettes if the grill uses gas as a heat source. An upper food grate 31 is supported by three L-shaped brackets 32 which are attached to the sidewall of the casing.

Still referring to FIGS. 3 and 4, the bottom of the casing 11 includes a flat central portion 35, a frusto-contical portion 36, and a flat annular portion 37 which terminates in an upwardly extending circular shoulder 38. The flat central portion is provided with a circular opening 39 which is aligned with the opening 22 in the base.

A flat slide plate 41 is supported by the casing above the upwardly extending shoulder 38. The diameter of the slide plate is slightly greater than the diameter of the shoulder, and the slide plate is secured against the casing by a pair of eye bolts 42 and 43. Each eye bolt includes a looped end 44 and shank 45 which extends through openings in the plate 41, the casing, and the base. A nut 46 is threaded onto the shank of each eye bolt to secure the casing, the collar, and the base together.

The slide plate 41 is provided with a central opening 47 which is aligned with the openings 39 and 22 in the casing and the base. The plate is also provided with openings 48 and 49 (FIG. 5) for the eye bolts 42 and 43, respectively. The bottom of the casing is provided with an opening 50 in the frusto-conical portion 36 (FIG. 4) for the eye bolt 42 and an opening 51 in the flat central portion 35 for the other eye bolt 43. The top wall of the base is provided with an opening 52 (FIG. 2) for the eye bolt 42 and an opening 53 for the eye bolt 43.

A damper disc or plate 56 is sized to cover the opening 47 in the slide plate 41. The damper disc is secured to a control rod 57, and the rod 57 extends slidably through the looped ends of the eye bolts 42 and 43. One end of the rod extends through an opening 58 (FIG. 3) in the outer casing of the grill, and a control knob 59 is mounted on the outer end of the rod.

When the damper disc 56 is in the position illustrated in FIG. 3, the disc complete covers the opening 47 in the slide plate 41. The eye bolt 43 is positioned to act as a limit stop to prevent the damper disc from moving far enough to the right to uncover any of the opening 47. In this position, flow of combustion air through the opening 47 is shut off.

Flow of combustion air through the opening 47 can be initiated by pulling the operating knob 59 to the left. As the damper disc moves to the left from its FIG. 3 position, the opening 47 will gradually be exposed, and combustion air can increasingly flow through the opening. Combustion air from outside the casing flows through the air opening 39 in the bottom of the casing and is supplied by the air openings 26 in the circular collar 25 and the air opening 22 in the base 12. The eye bolt 42 is positioned to act as a limit stop for the damper disc in the fully open position. When the damper disc completely uncovers the opening 47, the disc will engage the eye bolt 42. However, the damper disc is movable to any desired position intermediate the fully open and fully closed positions to control the flow of combustion air as desired.

The damper disc 56 is preferably circular in shape, and the outer periphery of the damper disc is advantageously flared downwardly to provide the damper disc with an inverted dish shape as shown in FIG. 7. The dish-shaped disc provides a relatively sharp downturned knife edge 60 which slidingly engages the top surface of the slide plate 41. This sharp edge provides good cleaning or scraping action as the disc slides over the plate 41 which scrapes ash, food drippings, and other debris from the path of the disc and the area surrounding the opening 47 and helps to prevent build-up of ash and debris between the disc and the plate. The circular edge of the damper disc may be maintained in sliding contact with the plate to provide the scraping action by sizing the diameter of the rod and the vertical dimension of the disc with respect to the top of the looped ends of the eye bolts so that the eye bolts hold the edge of the disc in contact with the plate.

The sliding or guillotine action of the damper disc permits the air opening 47 in the slide plate to be made relatively large while retaining the ability to provide sensitive adjustment to the effective size of the air opening and the flow of combustion air. A relatively large air opening reduces the possibility that ashes will build up around the opening and eventually clog the opening. Ashes which extend over the periphery of the opening will be unsupported, and a large opening reduces the possibility that the ashes can bridge the opening. The sliding action of the damper disc will also break up ash accumulation around the periphery of the air opening and decrease the possibility that the air opening will become clogged.

The control rod is provided with three grooves 62, 63, and 64 (FIGS. 3 and 8) adjacent the control knob 59. The grooves act as position indicators as the rod slides through the opening 58 in the grill casing and provide the operator with a tactile indication of the position of the rod and the damper plate. The operator can therefore quickly reset the control rod to a position that has worked well on previous occasions.

In one specific embodiment of a small-sized portable barbecue grill, the diameter of the open upper end of the outer casing 11 was 15 inches, the diameters of the food grate 31 and rock grate 30 were 14.75 inches and 13.12 inches, respectively, and the diameter of the air opening 47 in the slide plate 41 was 2 inches. The diameter of the damper disc 56 was $2\frac{1}{2}$ inches.

Since the openings in the slide plate, the bottom of the casing, and the base are aligned along the centerline of the grill, ashes and food drippings can fall through the openings to the supporting surface. If desired, a disposable aluminum pie pan or the like can be positioned inside the base below the openings to catch ashes and drippings.

The structure of the grill and the damper assembly is simple, and the grill and damper assembly can be assembled and disassembled quickly and easily. Referring to FIG. 2, the collar 25 is positioned on the top wall of the base 12, and the grill 11 is positioned on top of the collar. The slide plate 41 is positioned in the bottom of the casing so that the bolt holes of the slide plate, casing, and base are aligned. The eye bolts are slid over opposite ends of the control rod, and the outer end of the control rod is inserted through the opening 58 in the casing. The shanks of the eye bolts are then inserted through the bolt openings, and the nuts are threaded onto the eye bolts to draw the entire assembly together in clamping relationship. Thereafter, the control knob 59 can be screwed onto the outer end of the control rod 57. The grates 30 and 31 can then be inserted over the damper assembly.

If the grill is a charcoal grill, the charcoal briquettes can be placed on the rock grate 30. If the grill is a gas grill, a conventional gas burner will be positioned between the damper assembly and the rock grate 30.

The damper assembly can also be used with a smoker grill as well as a barbecue grill. For example, the grill illustrated in FIG. 1 can be converted into a smoker grill by mounting a conventional cylindrical smoker section above the casing 11. Accordingly, as used in the specification in claims, the term "barbecue grill" is meant to include smoker grills as well as barbecue grills.

Although I have described the damper disc as being slidably mounted on a separate horizontal slide plate 41, it will be understood that the damper disc could also be slidably mounted on a flat portion of the bottom of the casing. However, the preferred embodiment utilizes a separate slide plate.

While in the foregoing specification a detailed description of a specific embodiment of the invention was set forth for the purpose of illustration, it will be understood that many of the details hereingiven may be varied considerably by those skilled in the art and without departing from the spirit and scope of the invention.

I claim:

1. A damper assembly for a barbecue having an outer casing, the outer casing having a bottom and an upwardly extending sidewall, the damper assembly including:
   (a) a generally horizontally extending slide plate mounted within the outer casing above the bottom wall, the slide plate having upper and lower surfaces and having an opening therethrough,
   (b) a pair of eye bolts, each eye bolt having a looped end and a shank, the looped end of each eye bolt being positioned above the slide plate and the shank of each eye bolt extending through the slide plate and being secured to the bottom of the outer casing,
   (c) a damper plate having an outside dimension greater than the diameter of the opening in the slide plate, and
   (d) a rod secured to the damper plate and extending slidably through the looped ends of the eye bolts whereby the damper plate is maintained in sliding contact with the upper surface of the slide plate, the rod and the damper plate being movable between a first position in which the damper plate covers the opening in the slide plate and a second position in which the damper disc uncovers the opening in the slide plate, the rod having an end which extends through an opening in the outer casing whereby the rod and the damper plate can be moved from outside of the casing.

2. The damper assembly of claim 1 in which the periphery of the damper disc is flared downwardly toward the slide plate.

3. The damper assembly of claim 1 in which the damper plate engages one of the eye bolts when the damper plate is in its first position whereby movement of the damper plate beyond the first position is prevented.

4. The damper assembly of claim 3 in which the damper plate engages the other eye bolt when the damper plate is in its second position whereby movement of the damper plate beyond the second position is prevented.

5. The damper assembly of claim 1 in which the rod is provided with a position-indicating groove.

6. The damper assembly of claim 1 in which the rod is provided with a plurality of longitudinally spaced position-indicating grooves.

7. A damper assembly for a barbecue having an outer casing, the damper assembly including a slide plate mounted within the outer casing, the slide plate having upper and lower surfaces and having an opening therethrough, a pair of eye bolts, each of the eye bolts having a looped end and a shank, the shank of each eye bolt extending through the slide plate and being secured to the casing, a damper plate slidably mounted on the upper surface of the slide plate for movement between first and second positions, the damper plate being sized to cover the opening in the slide plate when the damper plate is in its first position, and a rod secured to the damper plate and extending through the looped end of each of the eye bolts and through an opening in the outer casing to the outside of the outer casing for sliding the damper plate between said first and second positions.

8. The damper assembly of claim 7 in which the periphery of the damper plate is flared downwardly towards the slide plate.

9. The damper assembly of claim 7 in which the rod is provided with a position-indicating groove.

* * * * *

UNITED STATES PATENT AND TRADEMARK OFFICE
CERTIFICATE OF CORRECTION

PATENT NO. : 4,436,081

DATED : March 13, 1984

INVENTOR(S) : Dennis V. Hefling

It is certified that error appears in the above-identified patent and that said Letters Patent is hereby corrected as shown below:

In column 5, lines 25 and 31 "disc" should be --plate--.

Signed and Sealed this

Nineteenth Day of June 1984

[SEAL]

Attest:

GERALD J. MOSSINGHOFF

Attesting Officer

Commissioner of Patents and Trademarks